(12) United States Patent
Nakada et al.

(10) Patent No.: US 10,210,529 B2
(45) Date of Patent: Feb. 19, 2019

(54) SYSTEMS AND METHODS FOR ADVERTISING ON REMOTE LOCATIONS

(75) Inventors: Mark Nakada, Salt Lake City, UT (US); Jon Butler, Salt Lake City, UT (US)

(73) Assignee: MEDIAPORT ENTERTAINMENT, INC., Salt Lake City, UT (US)

(*) Notice: Subject to any disclaimer, the term of this patent is extended or adjusted under 35 U.S.C. 154(b) by 1444 days.

(21) Appl. No.: 11/397,050

(22) Filed: Apr. 3, 2006

(65) Prior Publication Data

US 2006/0265280 A1 Nov. 23, 2006

Related U.S. Application Data

(60) Provisional application No. 60/667,638, filed on Apr. 4, 2005, provisional application No. 60/672,427, filed on Apr. 19, 2005, provisional application No. 60/672,428, filed on Apr. 19, 2005.

(51) Int. Cl.
*G06Q 30/02* (2012.01)

(52) U.S. Cl.
CPC ......... *G06Q 30/02* (2013.01); *G06Q 30/0253* (2013.01); *G06Q 30/0268* (2013.01); *G06Q 30/0271* (2013.01)

(58) Field of Classification Search
CPC .................................................. G06Q 30/0258
USPC .......................................................... 705/14
See application file for complete search history.

(56) References Cited

U.S. PATENT DOCUMENTS

| | | | |
|---|---|---|---|
| RE30,037 E | 6/1979 | Bass | |
| 4,412,292 A | 10/1983 | Sedam et al. | |
| 4,528,643 A | 7/1985 | Freeny, Jr. | |
| 4,646,234 A | 2/1987 | Tolman et al. | |
| 4,674,055 A | 6/1987 | Ogaki et al. | |
| 4,796,220 A | 1/1989 | Wolfe | |
| 5,237,157 A | 8/1993 | Kaplan | |
| 5,307,354 A | 4/1994 | Cramer | |
| 5,418,713 A | 5/1995 | Allen | |
| 5,445,295 A | 8/1995 | Brown | |
| 5,675,645 A | 10/1997 | Schwartz et al. | |

(Continued)

OTHER PUBLICATIONS

Nakada, et al. Remote Monitoring Methods. U.S. Appl. No. 11/773,540, filed Jul. 5, 2007.

(Continued)

*Primary Examiner* — Jamie R Kucab

(74) *Attorney, Agent, or Firm* — Loza & Loza, LLP; Tyler J. Barrett

(57) ABSTRACT

Systems and methods for delivering digital content from a central location to one or more remote locations while advertising at the remote locations are described. The systems contain a centrally-located device where the digital content is stored, a remotely-located device for delivering the digital content to an end user, and means for semi-dynamically transferring the digital content from the central location to the remote location. At the remote location(s), the digital content may be previewed, viewed, or purchased by the end user. Both electronic and physical advertisements may be displayed according to demographic data collected from users, browsing activities, and the like. Security information may be delivered along with the digital content to reduce or eliminate unauthorized duplication or distribution of the digital content.

24 Claims, 6 Drawing Sheets

(56) References Cited

U.S. PATENT DOCUMENTS

| | | |
|---|---|---|
| 5,715,403 A | 2/1998 | Stefik et al. |
| 5,734,719 A | 3/1998 | Tsevdos |
| 5,768,142 A | 6/1998 | Jacobs |
| 5,794,217 A | 8/1998 | Allen |
| 5,848,398 A | 12/1998 | Martin et al. |
| 5,875,110 A | 2/1999 | Jacobs |
| 5,903,647 A | 5/1999 | Ronning |
| 5,978,775 A | 11/1999 | Chen |
| 5,991,735 A | 11/1999 | Gerace |
| 6,016,520 A | 1/2000 | Facq et al. |
| 6,125,388 A | 9/2000 | Reisman |
| 6,145,102 A | 11/2000 | Klein |
| 6,223,089 B1 | 4/2001 | Page |
| 6,226,618 B1 * | 5/2001 | Downs et al. ............. 705/1 |
| 6,286,029 B1 | 9/2001 | Delph |
| 6,289,455 B1 | 9/2001 | Kocher et al. |
| 6,323,894 B1 | 11/2001 | Katz |
| 6,330,490 B1 | 12/2001 | Kim et al. |
| 6,381,575 B1 | 4/2002 | Martin et al. |
| 6,397,189 B1 | 5/2002 | Martin et al. |
| 6,535,791 B1 | 3/2003 | Wang |
| 6,651,190 B1 | 11/2003 | Worley |
| 6,654,757 B1 | 11/2003 | Stern |
| 6,655,580 B1 | 12/2003 | Ergo et al. |
| 6,658,464 B2 | 12/2003 | Reisman |
| 6,662,080 B2 | 12/2003 | Wakai et al. |
| 6,691,229 B1 | 2/2004 | Nelson |
| 6,697,962 B1 | 2/2004 | McCrory |
| 6,711,464 B1 | 3/2004 | Yap et al. |
| 6,738,906 B1 | 5/2004 | Hippelainen |
| 6,748,360 B2 | 6/2004 | Pitman et al. |
| 6,748,537 B2 | 6/2004 | Hughes |
| 6,748,539 B1 | 6/2004 | Lotspiech |
| 6,757,850 B1 | 6/2004 | Lehner |
| 6,769,061 B1 | 7/2004 | Ahern |
| 6,799,165 B1 | 9/2004 | Boesies |
| 6,813,733 B1 | 11/2004 | Li et al. |
| 6,830,160 B2 | 12/2004 | Risolia |
| 6,832,318 B1 | 12/2004 | Yaegashi et al. |
| 6,832,319 B1 | 12/2004 | Bell et al. |
| 6,839,597 B2 | 1/2005 | Hattori et al. |
| 6,853,985 B1 | 2/2005 | Yamashita et al. |
| 6,854,645 B1 | 2/2005 | Sommers, Jr. et al. |
| 6,860,429 B2 | 3/2005 | Stebbings et al. |
| 6,865,551 B1 | 3/2005 | Stefik et al. |
| 6,865,555 B2 | 3/2005 | Novak |
| 6,865,676 B1 | 3/2005 | Staring et al. |
| 6,895,285 B2 | 5/2005 | Maity |
| 6,904,458 B1 | 6/2005 | Bishop et al. |
| 6,976,009 B2 | 12/2005 | Tadayon et al. |
| 7,356,771 B2 * | 4/2008 | Paul et al. ............. 715/744 |
| 2002/0161476 A1 * | 10/2002 | Panofsky et al. ............. 700/231 |
| 2002/0184517 A1 | 12/2002 | Tadayon et al. |
| 2003/0196121 A1 * | 10/2003 | Raley et al. ............. 713/201 |
| 2003/0217306 A1 | 11/2003 | Harthcock et al. |
| 2003/0229406 A1 | 12/2003 | Mait |
| 2003/0229797 A1 | 12/2003 | Newman |
| 2004/0024727 A1 | 2/2004 | Bowman |
| 2004/0059782 A1 | 3/2004 | Sivertsen |
| 2004/0213408 A1 | 10/2004 | Kim et al. |
| 2004/0225381 A1 | 11/2004 | Ritz et al. |
| 2005/0010805 A1 | 1/2005 | Jascau et al. |
| 2005/0021948 A1 | 1/2005 | Kamperman |
| 2005/0021995 A1 | 1/2005 | Lal et al. |
| 2005/0039000 A1 | 2/2005 | Erickson |
| 2005/0044016 A1 | 2/2005 | Irwin |
| 2005/0071663 A1 | 3/2005 | Medvinsky |
| 2005/0071669 A1 | 3/2005 | Medvinsky |
| 2005/0086326 A1 | 4/2005 | Manning et al. |
| 2005/0097182 A1 | 5/2005 | Bishop et al. |
| 2005/0120212 A1 | 6/2005 | Kanungo et al. |
| 2005/0138406 A1 | 6/2005 | Cox |
| 2005/0188424 A1 | 8/2005 | Kizyma |
| 2005/0267845 A1 | 12/2005 | Oh et al. |
| 2005/0271205 A1 | 12/2005 | Shen et al. |
| 2005/0273862 A1 | 12/2005 | Benaloh et al. |
| 2005/0278716 A1 | 12/2005 | Koppen et al. |
| 2006/0074769 A1 * | 4/2006 | Looney ............. G06Q 30/02 705/14.66 |
| 2006/0224517 A1 | 10/2006 | Shimpi et al. |
| 2006/0249576 A1 | 11/2006 | Nakada et al. |
| 2006/0287913 A1 | 12/2006 | Baluja |
| 2008/0004748 A1 | 1/2008 | Butler et al. |
| 2008/0052158 A1 * | 2/2008 | Ferro ............. G06Q 30/02 705/14.51 |
| 2008/0255870 A1 | 10/2008 | Butler |
| 2009/0006900 A1 | 1/2009 | Lastras-Montano et al. |
| 2009/0012873 A1 | 1/2009 | Hamling et al. |
| 2009/0053992 A1 | 2/2009 | Butler |
| 2010/0127013 A1 | 5/2010 | Butler |
| 2010/0169652 A1 | 7/2010 | Butler |
| 2010/0174655 A1 | 7/2010 | Butler et al. |

OTHER PUBLICATIONS

Nakada, et al. Systems and Method for Protecting Digital Content. PCT Application PCT/US07/65930; Filed: Apr. 4, 2007.

* cited by examiner

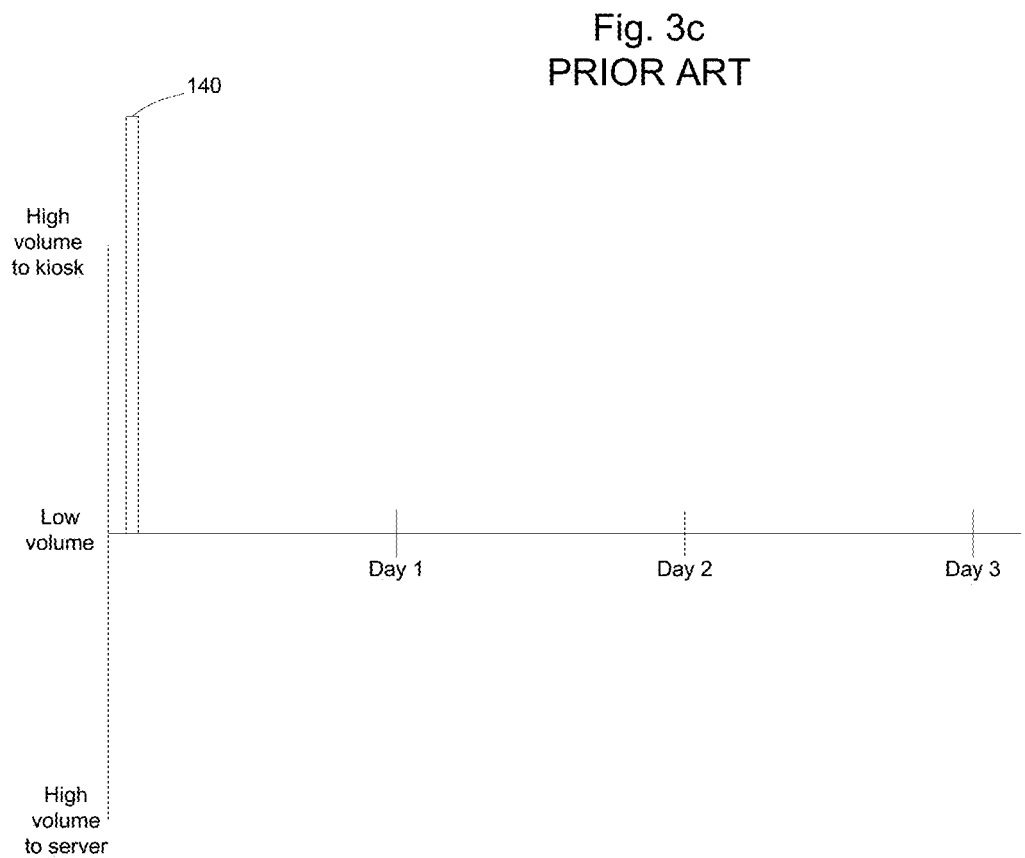

SYSTEMS AND METHODS FOR ADVERTISING ON REMOTE LOCATIONS

RELATED APPLICATIONS

This application claims priority of U.S. Provisional Applications Nos. 60/667,638, 60/672,427, and 60/672,428, the entire disclosures of which are incorporated herein by reference.

FIELD

This application relates generally to systems and methods for advertising. In particular, this application relates to systems and methods for advertising at remote locations, such as kiosks.

BACKGROUND

Many types of information and content are now stored digitally, including books, music, movies, software programs, video games, databases, advertisements, as well as other content. Because such content is stored digitally, it can be transferred easily using many types of electronic networks. See, for example, U.S. Pat. Nos. 5,875,110, 4,412,292, 5,848,398, 6,397,189, 6,381,575, 4,674,055, 5,445,295, 5,734,719, 6,286,029, 6,799,165, 6,655,580, 6,330,490, 6,662,080, 6,535,791, 6,711,464, 5,237,157, 6,654,757, 5,794,217, and 6,748,539, the entire disclosures of which are incorporated herein by reference. Both private and public electronic networks, including the Internet, are frequently used to transfer the digital content.

Often the digital content is transferred electronically so that it can be sold to an end user who is not located where the digital content is originally stored. The digital content can be sold for a variety of purposes, including education, entertainment, research, or other purposes. The digital content may be sold in any number of technological formats known in the art that permit storage and retrieval of the digital data, include floppy discs, compact discs of several varieties; video discs of several varieties, including digital video discs; magnetic storage devices using a variety of forms and technologies; and solid state devices of several varieties.

Most of digital content sales have been to users of computers that are connected to each other via networks of various types, e.g., the Internet. But users are not always located at a computer when they desire to purchase the digital content, or they have a computer but it is not connected to a network. Consequently, sales of digital content have begun using devices in remote locations including stand-alone devices (such as kiosks) in retail or other high-traffic areas. The stand-alone devices may be attended or unattended.

In addition to delivering the digital content, the devices in remote locations can also be used to advertise to the user of the remote device. But the advertising capabilities offered at remote locations have been limited for several reasons. First, the advertising has been limited by data transmission speeds to/from the remote device and the storage capabilities of the remote devices. Second, targeted advertising to specific users at remote locations has been limited by the small amount of feedback that can be gathered and used. Even when some feedback is available, the advertising is poorly targeted, increases sales only marginally, and is not cost-effective. The third reason the advertising has been limited is that the user may become frustrated with non-relevant advertisements, causing dissatisfaction and potentially causing the user to abandon the transaction at the remote location. Finally, many remote locations that display advertisements have only offered advertisements without a product, thereby lacking sufficient incentive to attract the user to view the entire advertisement.

SUMMARY

Systems and methods for delivering digital content from a central location to one or more remote locations while advertising at the remote locations are described. The systems contain a centrally-located device where the digital content is stored, a remotely-located device for delivering the digital content to an end user, and means for semi-dynamically transferring the digital content from the central location to the remote location. At the remote location(s), the digital content may be previewed, viewed, or purchased by the end user. Both electronic and physical advertisements may be displayed according to the data obtained at the remote device, including demographic data, browsing activities, purchasing date, and the like. The data collected can be then used to customize the advertising for an individual user or a group of users.

DESCRIPTION OF THE DRAWINGS

The following description can be better understood in light of the Figures, in which:

FIG. 3c contains a graph illustrating conventional download and upload activity between a server and a kiosk for static content;

Figure 1:
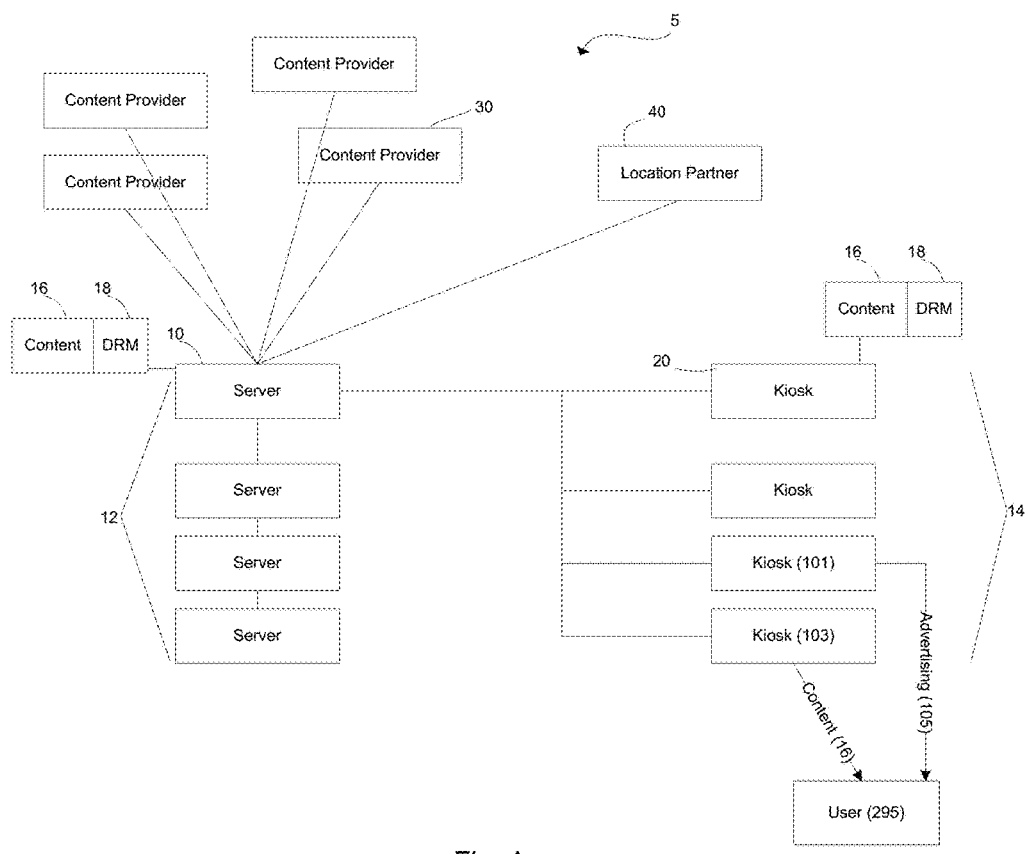
FIG. 1 depicts a block diagram representing an exemplary distributed networking system for delivering digital content.

Together with the following description, the Figures demonstrate and explain the principles of the systems and methods for delivering digital content. In the Figures, the thickness and configuration of components may be exaggerated for clarity. The same reference numerals in different Figures represent the same component.

DETAILED DESCRIPTION

The following description provides specific details in order to provide a thorough understanding. The skilled artisan, however, would understand that the systems and methods can be practiced without employing these specific details. Indeed, the systems and methods can be practiced by modifying the illustrated system and method and can be used in conjunction with apparatus and techniques conventionally used in the industry. While the invention is described for use with a kiosk, it could be used for any purpose, including many types of wireless computing devices, consumer electronic devices, military devices, or others.

The systems deliver digital content (or content) from a first location to one or more second locations that are optionally remote from the first location. Accordingly, the systems contain a first device in a first location where the digital content is stored, a second device in a second location for delivering the digital content to an end user, and means for semi-dynamically transferring the digital content from the first location to the second location. Electronic and/or physical advertisements can be displayed and/or distributed at the second device.

In some aspects, the systems for delivering content are illustrated in FIG. 1. As depicted in that Figure, the system 5 contains a first device (i.e., server 10) located in a first location. The first location can be located anywhere desired by the operator, i.e., in a central location (with central not referring to the geographic location). The first device acts as a repository for the digital content. Any device that can operate as a repository can be used as the first device.

One example of the first device comprises a server 10. Any type of server known in the art can be used as server 10. Examples of servers that can be used include a computer running a UNIX-style operating system, a computer running a Microsoft Windows operating system, or a personal computer workstation. The server 10 comprises any storage component on which the digital content can be stored. Examples of storage components include optical storage discs, DVD-RAM discs, and traditional magnetic hard disc drives.

In some aspects, multiple servers 12 may be connected together to make a server cluster. Using a server cluster permits sharing information regarding the content stored on each server 10 and each transaction the server 10 has recorded. By using a server cluster, the system 5 is always operational, regardless of the location of a particular component on the network that connects the components (such as the Internet). The server cluster can contain a primary cluster, which handles all critical tasks, with minor functions being routed to a secondary cluster. With this configuration, if the primary cluster is not operational, most functions can be handled by the secondary cluster. A server cluster also allows a large-scale deployment and interoperability, as well as data that can be stored on the network in multiple points of co-location.

The software components required for operating the server 10 may be included on a single server or on multiple servers, with each server implementing one or more tasks and communicating among themselves using standard networking protocols. Non-limiting examples of the server-focused tasks using the software components that may be implemented on one or more servers 10 include those of email server; Web server; file server; purchase transaction authentication server; content security server; and advertising message server.

As depicted in FIG. 1, the server 10 contains digital content 16. The types of digital content 16 that can be delivered are virtually unlimited. Examples of the digital content include music, movies, video games, software, mobile phone ring tones, electronic books, advertising, and other types of content. The format in which the digital content is stored is also virtually unlimited. Examples of the types of digital formats include pdf, doc, xls, jpeg, tiff, gif, xbm, pnm, mpeg2, mpeg4, mp3, wma, mov, wav, and avi, as well as combinations thereof.

The digital content 16 may be provided internally (by the entity that controls or operates the server 10), or externally by one or more third parties that are the copyright owners of the content or that act on behalf of the owners of the content (collectively, content providers 30). Non-limiting examples of content providers 30 include music publishers, recording companies, book publishers, mobile telephone companies, video game manufacturers, and advertisers. Content providers 30 may provide the content 16 to the server using any known mechanism, including via network connections known in the art or via other methods, such as providing a CD or DVD to the operator of a server 10.

The digital content 16 can include instructions indicating how the content may be used, distributed, sold, transmitted, or otherwise processed ("use instructions"). The server 10 can convert such use instructions into digital rights management (DRM) information 18 that can be associated with any desired content.

The content 16 may also contain metatags that correspond to information about any desired content, such as a genre of music or movie, an artist, a content provider, or otherwise. Metatags may be provided by a content provider 30 or created by the operator of a server 10. The metatags may indicate the use instructions for all content that is provided, with distinct use instructions for each piece of content, or with use instructions based on parameters that can be used to classify content. In one example of use instructions, a content provider 30 may indicate that music performed by musical artist A may be redistributed freely, without restriction, music performed by musical artist B may be redistributed freely when purchased at a set price, and music performed by musical artist C may be redistributed in a manner that permits the music to be copied to another computer three times, after which the music may not be copied to another computer, but only played (performed) on a computer where it is stored.

The content 16 may optionally be protected using various security techniques known in the art, including DRM. DRM controls how the content can be accessed or processed by end-users or by software or other tools operated under the control of end-users. As one example of DRM, a digital music file may include codes or other information indicating that the music file may not be copied to a different computer. If a person wishing to copy the music file to a different computer uses technologies, such as software programs, that are aware of the DRM information stored in the music file, the software programs will recognize the restrictions and prevent the action that is forbidden.

DRM may include any number or combination of restrictions, including those that are enabled by a DRM technology and that are selected by a content provider 30. Non-limiting examples of DRM restrictions include a restriction that visual or textual content not be printed in hardcopy; a restriction that copy-and-paste functions are disabled for textual content; a restriction that a music file may not be played after a certain date; a restriction that a music file or video file may only be played a fixed number of times; and a restriction that a file may only be copied to another device a fixed number of times.

DRM information may be provided by a content provider 30 or by the operator of a server 10. Either may assign a unique transactional ID to each piece of content 16. This unique transactional ID correlates to a set of use instructions and DRM specifications to control how the associated content is managed on devices, such as on the server 10, as further described hereinafter. The content 16 may therefore contain metatags, use instructions, and a transactional ID.

The content 16 may optionally be encrypted in a manner to increase security of the content during storage on a server 10 or on a kiosk 20, or during transfer between a content provider 30 and a server 10, or between a server 10 and a kiosk 20. Any number of encryption methods known to those in the art may be used to implement this feature. Examples of such encryptions include both symmetrical and asymmetrical encryption using a variety of methods, including RSA, DES, Triple DES, Blowfish, ElGamal, RC4, and others.

As described above, the system also contains a second device that can be located in a second location that is optionally remote from the first location. The second device receives the content from the first device and then distributes that content to an end user. Any device operating in this manner can be used as the second device. In some aspects, the second device comprises a kiosk 20 as depicted in FIG. 1.

When the second device is placed in a location that is remote from the first device, a location partner 40 can optionally be used in the system 5 as depicted in FIG. 1. The location partner 40 comprises an individual or entity that provides a space where the second device may be physically located. Non-limiting examples of such location partners include owners or managers of airports, bars, clubs, schools, gyms, stadiums, arenas, military bases, retail centers or shops, and eating establishments.

A location partner 40 may provide this space without charge, as a service to individuals that visit the space where the second device is placed. Or the location partner 40 may provide this space in exchange for a fee of some type, or in exchange for advertising time on the second device, or for other benefits. In some aspects, the location partner 40 may control or limit the content that is available via the second device. In other embodiments, the location partner can also control the advertising.

Kiosk 20 provides a point-of-sale experience for any user, including both actual and merely potential purchasers of the content and viewers of the advertisement. Any person can be a user 295 by interacting with the kiosk 20, whether purchasing content 16 from kiosk 101 or merely viewing the kiosk 103 and/or the associated advertising 105, as shown in FIG. 1. The kiosk 20 used in the system can be any kiosk known in the art or the kiosk described below. In some embodiments, the kiosk may physically display any known advertising, such as posters, banners, or adhesive advertisements. The kiosk 20 may be used in conjunction with products as a point-of-purchase display.

The kiosk 20 can contain any combination of number of video displays. In some aspects, the kiosk 20 contains two video displays, a first video display that displays advertising messages and a second video display that displays menus, samples of content, and related information appropriate to affect a purchase by an end-user of the content made available through the kiosk 20.

The kiosk 20 can also contain multiple input and output devices appropriate to interact with an end-user, display or perform the content stored on the kiosk 20, and complete a sales transaction related to the content. These input and output devices may include, for example, one or more of any of the following: a keyboard; a mouse; a trackball; a joystick; a touchscreen; a LED display; a LCD display; a label maker; an automatic coupon feeder; a barcode scanner; biometric scanning devices such as a fingerprint, voiceprint, or retinal scanner; a Compact Disc reader; a Compact Disc writer; a video disk reader; a video disk writer; and media device connectivity, including a USB port, an IEEE-1394 FireWire port, a SecureDigital (SD) port, a CompactFlash port, a PCMCIA port, a MemoryStick port, a laser printer, a receipt printer, a video camera, a credit card reader, a cash acceptor, a jewel case ejector, a phone docking station, speakers, voice recognition device, Braille input device, Bluetooth communications, Wi-Fi communications, and others known in the art. Furthermore, additional input, output, and storage technologies known in the art may be integrated with the kiosk 20 and the system 5.

Figure 2:
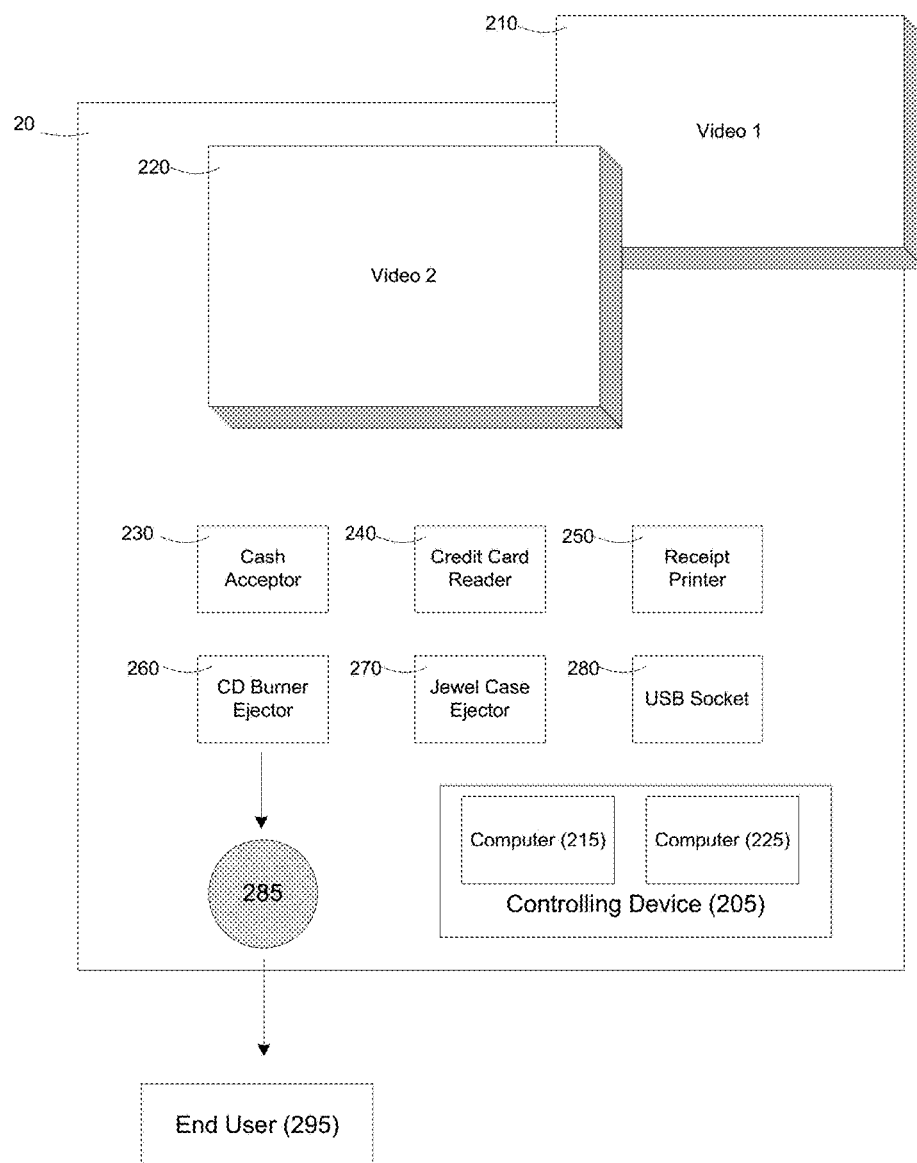
FIG. 2 illustrates a block diagram representing some of the components in an exemplary kiosk that can be used in delivering digital content.

The kiosk 20 can also include a controlling device 205 that operates the video displays, interacts with input and output devices, and communicates with other kiosks 20 or servers 10, as needed. In some aspects, the controlling device includes two or more computers, either sharing or dedicated to the needed tasks requisite to controlling operation. In some aspects, as shown in FIG. 2, one computer 215 handles the display, selection, and processing of content purchase transactions and a second computer 225 handles the display of advertising messages.

The system also contains any advertising known in the art. In some aspects, the advertising may include messages used to market, promote, or sell products or services or to enhance brand recognition, as well as training materials, entertainment content, community or location information, and other similar materials. In other aspects, the advertising may include video clips, audio clips, ring tones, printed coupons, promotional codes, brochures, literature, images, giveaways, discounts associated with digital content or other promotional or brand-related content. In some embodiments, advertising may be presented through video and/or audio presentations, animated PowerPoint presentations, flash programs, banners, pop-ups, screen-savers, wallpapers, posters, digital sampling, cost-per-pixel, cost-per-click, advertisement images, printed advertisements, trademarks and other similar advertisements. One example of the advertising includes the promotion of artists or performers, whose products or content are available for sale on the kiosk.

In some aspects, the advertising can be bundled with the content 16. In these aspects, the advertising is incorporated with or delivered along with the content 16 to the user in a digital or electronic format. One example of these aspects includes advertisements that are delivered with the content so that when a user accesses the content, the advertising is automatically displayed before or after the content. Another example includes advertisements that are delivered with the content so that the user can optionally choose to view the advertisement when the content 16 is accessed.

In other aspects, the advertising is separate from the content 16. In these aspects, the advertising can still be delivered to the user, but is not incorporated (or bundled) with the content 16. In some aspects, the advertising is delivered in an electronic format. In other aspects, however, the advertising is delivered in any known physical format. One example of this advertising includes printing on surface of the media (i.e., CD or DVD) that is distributed to the user or using a printed adhesive label that can be attached to the surface of the media. Another example of this advertising includes printed materials that are delivered with—but are separate from—the media, including printed coupons (i.e., for a given retail location or specific manufacturer), promotions, gift certificates, samples, pamphlets, discount codes, watermarks, etc. . . . . . In some aspects, this advertising can be bundled or incorporated with any transaction receipt that is given to the user. In other aspects, the advertising can be bundled with the packaging for the media on which the digital content is stored. For example, advertisements on the back of photo paper, advertising on the back of storage containers for the media (i.e., jewel cases), advertising on the inserts for the storage containers, directly printing on the storage containers, and advertising with the product packaging (such as plastic wrappers for the storage containers or paper sleeves for the media).

FIG. 2 illustrates one example of kiosk 20. In FIG. 2, kiosk 20 contains a video display 210 on which advertising messages are displayed; a video display 220 comprising a touch screen device through which an end-user may view and select content; a cash acceptor 230 through which an end-user may make payment for content; a credit card reader 240 through which an end-user may make payment for content; a receipt printer 250 that dispenses a paper receipt of a transaction when content is purchased; a CD burner ejector 260 that dispenses an audio CD containing content selected by an end-user during a purchase transaction; a jewel case ejector 270 that dispenses an empty jewel case for holding an audio CD; and a USB socket 280 to which an end-user may connect a device for delivery of content, as described in this specification. As noted previously, a kiosk 20 may contain different—or additional-components that those shown in FIG. 2.

When an end-user purchases content 16 through a kiosk 20, that content is made available to the end-user 295 via any delivery device known in the art. Non-limiting examples of delivery devices that can be include: audio CD 285 as shown in FIG. 2, DVD or similar video or data disc, writeable data CD such as WORM or CD-RAM, magnetic and solid state storage devices that communicate with a kiosk 20 via any means known in the art, and hard-copy paper. In some aspects, the content can be placed on a delivery device can include plug-ins or software which has advertising integrated and can be used to play the content received.

In some embodiments, the kiosk 20 comprises a single video display, a keyboard, and a mouse. An end-user can interact with the server 10 using the kiosk 20 that contains any standard Web page and uses any appropriate Web server software as well-known in the art.

The various components of the system can be electronically connected to each other using any means known in the art. Many technologies are known in the art for connecting a first device containing content to a second device, where the content may be used, displayed, or purchased from that second device. Non-limiting examples of these technologies include Ethernet, frame relay, DSL, satellite uplink, cable modem, analog modem, fibre channel, infrared and microwave transmissions, wireless communications of various types, and other networking technologies known in the art. Such connections may also be constructed through a publicly accessible network, such as the Internet, so long as appropriate security measures, as are known in the art, are used to prevent unauthorized access to the content that passes across the connection. A private network connection may also be used in order to reduce the reliance on such security measures and to further ensure the integrity of content that is transferred via this connection.

Such connections may further be used to facilitate administrative communications between the first device and the second device. In some aspects, server 10 and a kiosk 20 may communicate at regular or scheduled intervals, in real-time, or may communicate in an ad hoc manner according to needs that arise as determined by the server 10 or the kiosk 20. Non-limiting examples of information communicated by a kiosk 20 to a server 10 includes data regarding the up or down state of the kiosk 20, performance statistics such as download speed or average wait times, the operating state of specific software components, user browsing activities (for example, content viewed or selected, the time spent viewing different content, and purchased content), demographic data (age, sex, ethnicity, mailing address, telephone number, e-mail address etc.), user preferences, advertisements viewed, survey data, content viewed before purchases, security alarm information, cookies, and the need to refill supplies such as printer paper or blank audio CDs. These connections and communications not only allow for such things as the relay of information regarding system performance, stocking needs, physical upkeep, statistical information and so forth, but also allow for collection of both general and specific market research data gathered during transactions, thereby allowing for customization of the content and/or the advertising provided. Through such customization, the advertising can be better targeted for viewer needs and desires and allow for advertising to broad general audience or even niche markets and individual users.

In some aspects, the various components of the system need not be electronically connected. For example, the kiosk 20 need not be connected to the server 10 on a continuous basis. Rather, the kiosk operates in a stand-alone mode, with content being transferred to the kiosk 20 via non-networked means, and purchase transactions and demographic data being collected via non-networked, intermittent means. A stand-alone kiosk 20 can be used, for example, when security procedures or network connectivity are not available, such as a kiosk 20 located on a military base in a different country than the server 10 from which it would otherwise receive content.

Figure 4:
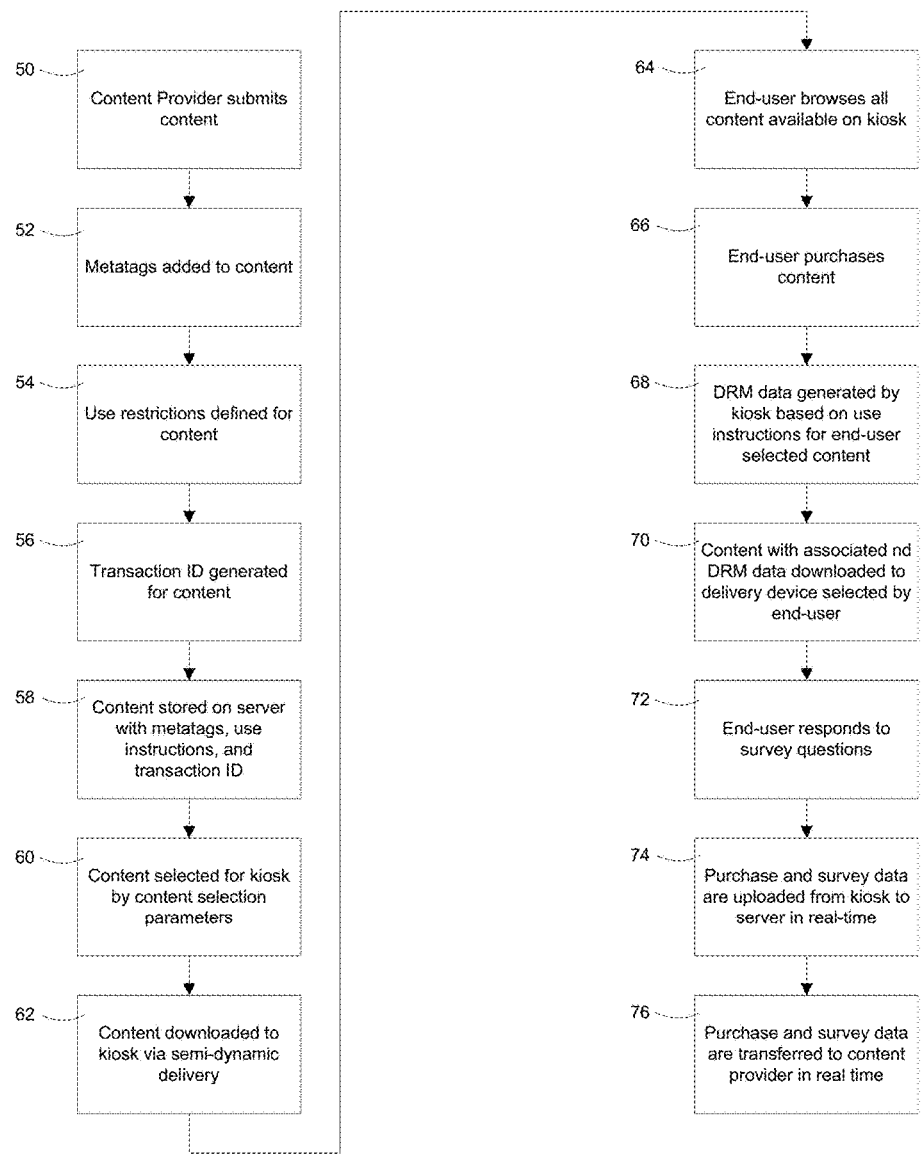
FIG. 4 illustrates some of the activities that are part of one method for delivering digital content at a remote location.

The systems described above can be used to transfer the digital content from the first device to the second device, where it then can be optionally distributed to an end-user. One example of how the systems can be used is depicted in FIG. 4. In this example, the method begins at 50 where the content 16 may optionally be provided by the content provider. Then at 52, the metatags can be optionally added to the content, whether by the content provider 30 or the operator of the system. Next at 54, the use restrictions can be optionally defined for the content 16, again whether by the content provider 30 or the operator of the system. Then at 56, the transactional ID can be optionally provided for the content, once again whether by the content provider 30 or the operator of the system.

This exemplary method continues at 58, where the content is stored on the first device (i.e., server 10), along with the metatags, use instructions, and transactional ID when they are used. The content is next selected for any desired second device—whether a single kiosk 20 or multiple kiosks 14—at 60 in FIG. 4. Typically, this content is selected by the content selection parameters. Then at 62, the content 16 is then transferred (or downloaded) from the server to the kiosk.

While the digital content can be transferred by the system in any manner, in some aspects it can be transferred in a semi-dynamic manner. Semi-dynamic transfers occur when, for example, server 10 downloads content to the storage media located at a kiosk 20 at regular intervals (sometimes referred to as "scheduled push times"). The content 16 is transferred from a server 10 to a kiosk 20 via connections between the server 10 and the kiosk 20, based on patterns of access for that kiosk 20 that the server 10 has determined will make the most efficient use of the kiosk 20. At each scheduled push time, some content may be deleted from the kiosk 20 if it appears to be in less demand than other content and the storage available at the kiosk 20 is full; once content is downloaded to the kiosk 20, it is available for repeated, immediate perusal or purchase by end-users. If particular content is desired by an end-user but is not currently stored on the kiosk 20, the content can be retrieved from a server 10 in real-time; but the server 10 is able to calculate which content is the most likely to be requested at each kiosk 20 and to update the content at the kiosk 20 at the scheduled push time so that the most likely requests can be fulfilled without the need to download content in real-time. Real-time downloads slow a purchase transaction significantly and may cause an end-user to abandon the transaction.

Figure 3A:
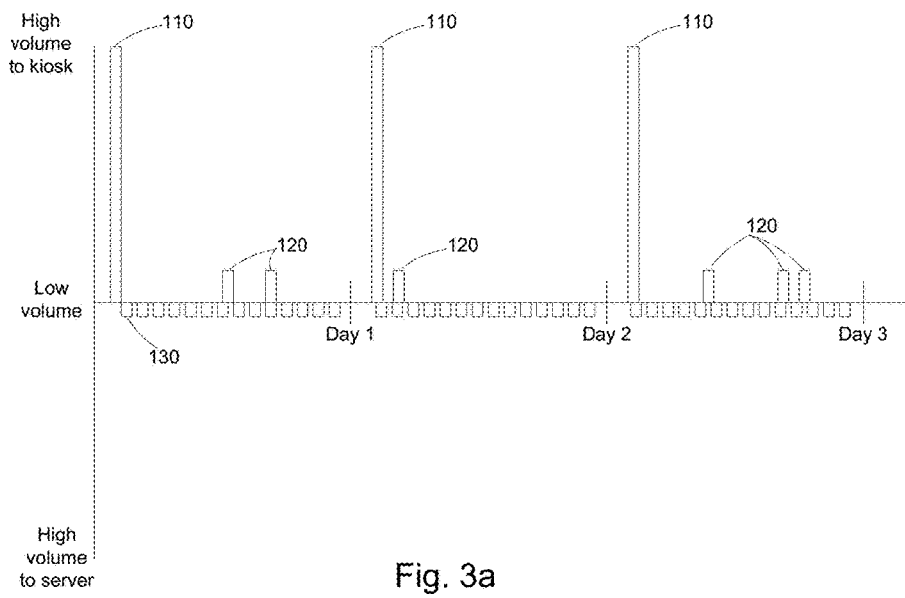
FIG. 3a contains a graph illustrating download and upload activity between a server and a kiosk for semi-dynamic content.

One example of a semi-dynamic transfer can be illustrated by the chart shown in FIG. 3*a*. In this chart, a large amount of data in the form of content is downloaded from server 10 to kiosk 20 at each scheduled push time 110. Most purchases by end-users are fulfilled using content downloaded at scheduled push time 110. If the desired content is not located on the kiosk 20, a real-time download 120 can occur, though these are infrequent when semi-dynamic content is used. Server data uploads 130 show that for each purchase transaction, purchase data and other data is uploaded to server 10, as described in this specification.

Figure 3B:
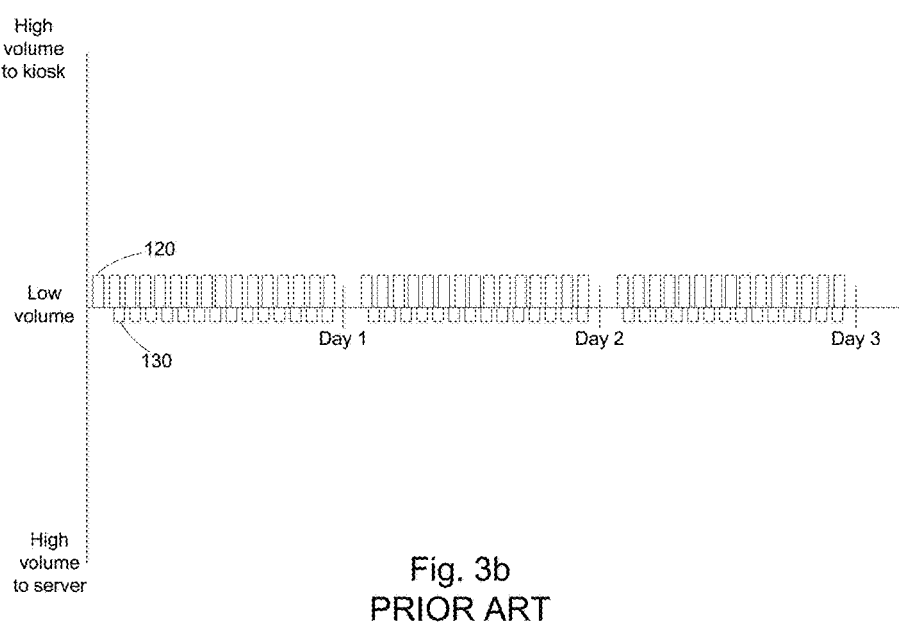
FIG. 3b contains a graph illustrating conventional download and upload activity between a server and a kiosk for dynamic content.

Semi-dynamic content may be contrasted with fully-dynamic content, as is known in the prior art, and as illustrated in FIG. 3*b*. When fully-dynamic content is used, the content available for purchase at a remote location is always transferred in real-time from another location. The real-time downloads 120 occur with every purchase transaction, resulting in often unacceptable delays for end-users, as well as inefficient use of network connectivity resources. Semi-dynamic content may also be contrasted with static content, as is known in the prior art, and as illustrated in FIG. 3*c*. When static content is used, a kiosk contains only a fixed set of content and cannot display or offer for sale any other content than what is currently stored at the kiosk. This is represented by the static download 140 in FIG. 3*c*. Static download 140 may occur via a network connection or via a manual data load using various data transfer mechanisms as are known in the art. FIG. 3*c* illustrates that, without any real time downloads, no delays are introduced to dismay end-users; conversely, there is a necessarily limited set of content available. Semi-dynamic content avoids the undesirable limitations of both prior art techniques.

When the content is transferred from the server to the kiosk, the operator of a server 10 may customize which content (or category, group of content, or advertising) is transferred semi-dynamically, as well as customize which content is transferred from a server 10 to a particular kiosk 20 (or to a collection of multiple kiosks 14). Such a customization may be based upon factors such as statistics showing which content is most popular or most purchased at a given kiosk, survey data, customer browsing activity, customer profile, customer selected preferences, demographic data, price point of content, the requirements or requests of the owners of venues in which a kiosk is located (location partner 40 as shown in FIG. 1), or territorial requirements (such as state law regarding explicit content). As non-limiting examples of the content selection parameters specified by a location partner 40, a location partner 40 that owned a venue catering to children may indicate that only music having no profanity in lyrics and only movies having a rating of G or PG are to be offered for sale; a location partner 40 may also indicate that only country music and only movies having either Clint Eastwood or John Wayne are to be offered for sale. An example of such parameters specified by a location partner 40 comprises a location partner 40 selling sports equipment may specify that advertising has a sports theme.

In some aspects of this transfer process, the semi-dynamic transfer can be optimized by the system. In these aspects, the server 10 can track what content and advertising messages are available at one or more kiosks 20 so as to enable the server 10 to efficiently determine what content or advertising messages to provide to each kiosk 20 during semi-dynamic data transfers, and also to permit the server 10 to report to other kiosks 20, to content providers 30, to location partners 40, or to other authorized third parties the locations of specific content or aggregate or statistical data derived therefrom.

In some aspects, the method of using the system also includes the process of distributing the content to the end-user. As noted above, the second device of the system can be used to distribute the digital content to an end-user. For the system 5 illustrated in FIG. 1, the kiosk 20 can distribute the content to any desired end-user. The end-user can access the kiosk at any locations where the kiosk is located. The kiosk 20 may be placed in any public (or private) location where members of the public will be drawn to it. A kiosk 20 owned or controlled by one entity may also be placed in a location designated by a location partner 40 that owns or controls the location of placement.

An end-user may be drawn to view or interact with a kiosk 20 by the advertising messages displayed physically or electronically on the kiosk, on a video screen, by the knowledge derived from independent sources that the kiosk 20 provides content for perusal and sale, or by any other factor. The advertising displayed on the kiosk 20 may be selected via any selection parameters, which may include random selection; content or image targeting; selection by parameters provided to the operator of a server 10 by a location partner 40 that controls the venue where a kiosk 20 is located; automatic selection by a kiosk 20 based upon choices made during the interactions of a specific end-user; software located at a kiosk 20, or software operating at a server 10 (with the selection then communicated to a kiosk 20). Demographic data collected or known regarding a specific end-user or a class of end-users may be used by software on a kiosk 20 or a server 10 as a factor in selecting which advertising messages will be displayed, as described below.

Figure 5:
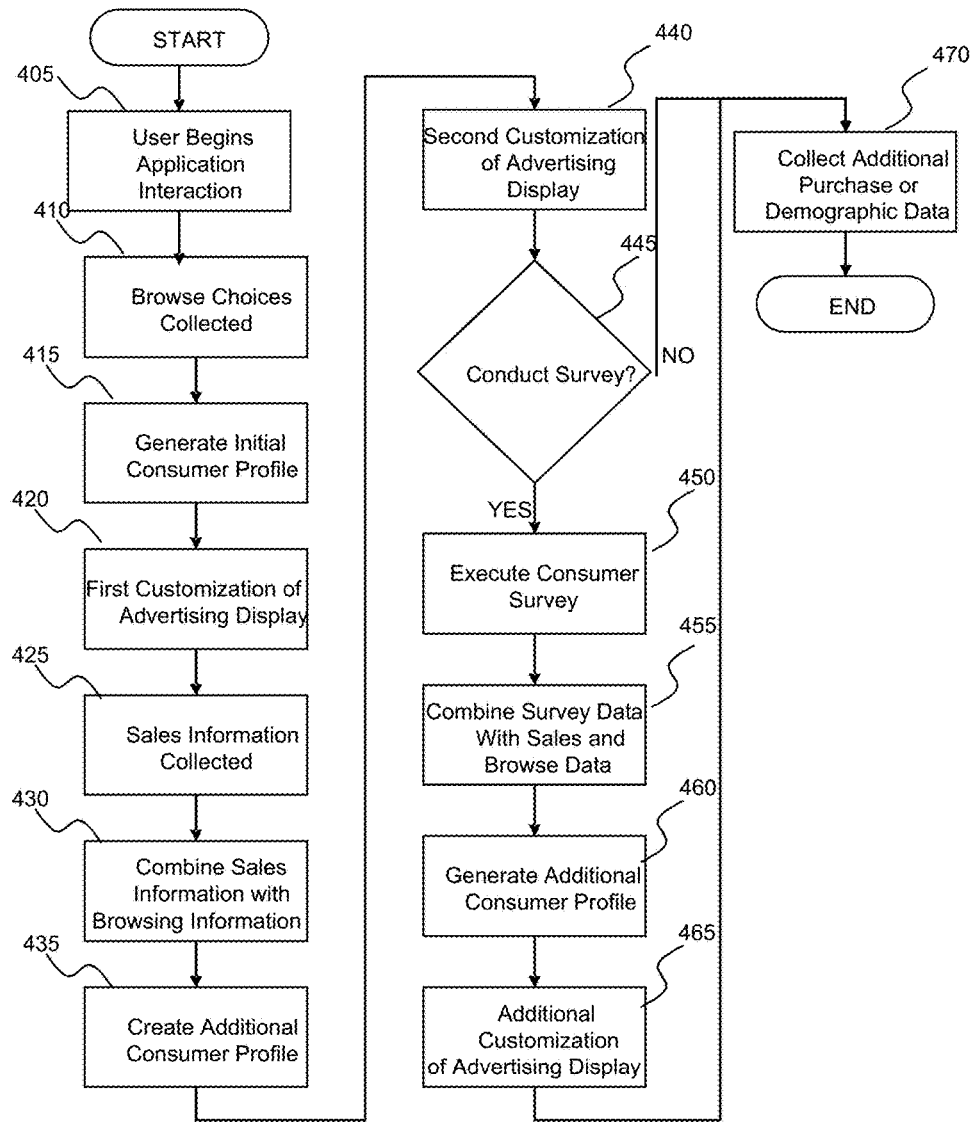
FIG. 5 illustrates some of the activities that are part of one method for advertising on a device located at a remote location.

The user can interact with the kiosk 20 in any desired manner, whether or not content is actually distributed or whether the advertising is actually distributed or viewed. Typically, the interaction proceeds in the following manner, although many variations are possible as to the steps followed by a particular user and the following steps need not be followed sequentially. An example of part of a process for viewing, selecting, and/or distributing content is illustrated in FIG. 4 while a process for displaying and/or distributing advertising is illustrated in FIG. 5. These two processes can be practiced simultaneously or separately.

At 64 in FIG. 4, the end-user can optionally view advertising on the first video screen and optionally begins to use an input device located on or adjacent to the kiosk to navigate among a collection of content that is available for review or sale via the kiosk. Next at 66, the user may optionally experience samples of content via the first or second video screen or another output device located on or adjacent to the kiosk. In one example, an end-user can listen to the first 30 seconds of a music file that is available for purchase via the kiosk. The end-user can then selects content to be acquired, typically by paying a purchase price, and enters payment information as appropriate to the transaction, such as a credit card number or other account number through which a payment may be collected.

At 68 in FIG. 4, the method continues when DRM restrictions and license information are calculated as needed based on the use instructions associated with the content that was selected for purchase. The kiosk 20 can use multiple factors to generate customized DRM licensing information that is included in the content that is transferred to the delivery device. Next, as shown at 70, the end-user can select a delivery device onto which the content will be placed for use by the end-user and the content is delivered to the selected delivery device using the semi-dynamic content system and including the calculated DRM information that is derived from a) the use instructions provided by the content provider that provided that content; b) default settings selected by the operator of the server; and c) the delivery device selected by the end-user.

After the requested content has been transferred to a delivery device controlled by the end-user, the end-user may use the content as he or she chooses, within the limits of the DRM restrictions that were part of the content transferred to the delivery device. As a non-limiting example, an end-user who purchased a digital music file and downloaded that file to a solid state storage device using a USB interface (the delivery device in this example) might be permitted to copy the music file three times, such as from the delivery device to a desktop computer, from the desktop computer to an audio CD, and from the desktop computer to a portable music player device. After these three copying operations, the music file could not be copied to any other device, though it could be played from any of the four devices on which it existed (the original delivery device, the desktop computer, the audio CD, and the portable music player device).

As depicted at 72 in FIG. 4, the end-user can then answer questions or in other ways reveals demographic or personal data ("survey data"). This step is optionally completed while payment information is being authenticated, while content is being downloaded in real time (if necessary based on the current state of the semi-dynamic content), and while content is transferred from the kiosk to the selected delivery device.

The kiosk 20 then communicates to the server 10 (or any other kiosk) all information collected from the end-user, including purchase transaction data and survey data, as shown at 74. As well, the kiosk 20 can also transmit a report to the server 10 detailing the end-user's actions ("kiosk data"), including, as non-limiting examples, the following: the areas of the content navigation system visited by the end-user; the advertising content displayed immediately prior to and during the end-user's interaction with the kiosk; demographic data inherent in the location, design, or print advertising associated with the kiosk; demographic data collected from the end-user during the interaction; sales transaction data indicating purchases contemplated or completed by the end-user; the nature of the delivery device selected by the end-user; and others.

When the server 10 receives the kiosk data, it may be optionally collated, analyzed, summarized, or otherwise processed on a server using a variety of steps. The server 10 is configured to use the kiosk data from one or more kiosks 20 as a factor in determining what content to push to each kiosk 20, what advertising messages to push to each kiosk 20, and what advertising messages to display on one or both of the video screens both before and during interaction with a specific end-user.

After the purchase at 74, the kiosk 20 may optionally print a receipt during or after a purchase. This receipt constitutes a transaction record and may optionally include coupons, discount codes, printed advertising material, or similar promotional items. Such promotional items may optionally be selected based upon the browsing activities of the end-user, upon items purchased, or upon related factors, analyzed singly or in combination.

As depicted in FIG. 4, the kiosk data (which includes the purchase and survey data) can be optionally transferred from the server to a third party such as a content provider 30 as shown at 76. The kiosk data may be communicated to content providers or to other third parties designated by content providers, including copyright owners. If content providers, copyright owners, or others are due royalties or other payments based on use or sale of content, such royalties or other payments may be made from the operator of a server to the appropriate recipient using automated means as are known in the art, based upon kiosk data.

The kiosk data may be communicated to content providers or other third parties using a variety of techniques. In one technique, the entity controlling the server actively communicates to one or more content providers or other third parties using a means such as the following non-limiting examples: e-mail, EDI, or uploading of data to a separate computer controlled by the content provider or other third party. In a second technique, a content provider 30 or other third party is provided with access to the server 10 on which kiosk data is stored, or another server controlled by the same or an affiliated entity. This technique permits the content provider 30 or other third party to access kiosk data, including analyses and reports, at times determined by the content provider 30 or other third party. One example of a communication method by which a content provider 30 or other third party may access kiosk data on a server 10 is via a Web page provided by the entity that controls the server 10. This Web page is provided in one exemplary embodiment by the same Web server that provides a Web page embodiment of a kiosk 20, with the server 10 providing appropriate information to content providers 30 and to end-users based on login location, authentication information provided, and other criteria as is standard in the art.

As mentioned above, the system can also be used to advertise to a user at a kiosk. In some aspects, the system collects data from the kiosk based on how the kiosk is used and information collected at the kiosk. This data can then be used to customize the advertising for an individual user or a group of users.

As depicted at 405 in FIG. 5, the process of advertising at the kiosk begins when the user interacts with the kiosk 20. As shown in 410 of FIG. 5, the user's browsing choices can be collected using the system described above. These browsing choices can be used to create an initial user profile as shown at 415. At 420, the system can use this initial profile to initially customize the advertising for the user. For example, after a person browses the display and repeatedly selects media of a specific genre (i.e., songs performed by women country artists), the system can automatically update the advertising to display only advertisements of women country artists.

After the user has purchased some digital content, the sales information can be collected, as shown at 425 in FIG. 5. Next, at 430, this sales information may be combined with the previously collected browsing information and, as shown in 435, an additional user profile may then be created. At 440, the collected data can then be used as a factor to perform a second customization of the advertising, which may now be even more targeted and customized to the individual user.

As depicted at 450 in FIG. 5, the user can then answer questions or in other ways reveal demographic or personal data (collectively, survey data) when an optional survey has been conducted (at 445). In some aspects, this step can be completed while payment information is being authenticated, while content is being transferred to the kiosk, and/or while the content is transferred from the kiosk to the selected delivery device. As portrayed in 455, the survey data may then be combined with all of the other data, including the sales and browsing information (at 460). Next, at 465, an additional customization of the advertising display may then be completed. At 470, even if a survey has not been conducted, additional purchase or demographic data may still be collected.

The kiosk 20 may optionally print a receipt during or after a purchase. This receipt constitutes a transaction record and may optionally include coupons, promotional codes, printed advertising material, or similar promotional items. Such promotional items may optionally be selected based upon the browsing activities of the end-user, upon items purchased, or upon related factors, analyzed singly or in combination. Alternatively, such physical advertising can still be distributed to the user even where a printed receipt is not provided.

In some embodiments, the information collected from the user can include an email account. That account can be used to further customize the advertising for the user. As well, that email account can be used to send additional electronic advertising, including notices of upcoming content, events, products, and similar topics.

In other embodiments, the system can create individual membership accounts for a user. These accounts can be used to further customize the advertising for the user. As well, that email account can be used to send additional electronic advertising, including advertising tailored to the preferences set up by the user in the membership account.

Using these systems and methods, any type of advertising can be displayed to the actual or potential user. Examples of the types of advertising include content-targeted advertisements (targeted to text, pictures, products, etc . . . ), image specific ads (such as those described in U.S. Pat. No. 6,958,821, the disclosure of which is incorporated herein by reference), venue specific advertisements, random advertisements, affiliate advertising, demographic specific advertisements, banner advertisements, cost per click advertisements (i.e., such as those on Google Adsense, Overture and Enhance.com), cost per pixel advertisements (i.e., such as those MillionDollarHomePage.com), wallpaper advertisements, screensaver advertisements, sampling advertisements (i.e., movie trailers), flash pictures and videos, framed videos, pictures, commercials, pop-up advertisements, point of purchase advertisements, free downloads, advertisements displays before allowing access to content or product lists, entertainment advertisements to keep the customer entertained when kiosk engages in semi-dynamic transfer to download content, and promotional and discount codes displayed on screen after the purchase.

In one variation on the systems and methods described above, an end-user can interact with a kiosk 20 to select and purchase content, but selects a delivery device that is not co-located with the kiosk 20 at which the original interaction and purchase occurred (the "delivery location"). As one example, an end-user could interact with a server using a Web page embodiment of a kiosk 20, then select a separate kiosk 20 having a CD-burning output device as the delivery location. As a second non-limiting example, an end-user could interact with a server 10 via a first kiosk 20 having two video displays and a CD burner, but then discover that the end-user's preferred delivery device, an audio CD, was unavailable because all blank audio CDs at that particular kiosk 20 has been used. The end-user could then select as the delivery location a kiosk 20 located in another building on the same campus where blank audio-CDs were available; or the end-user could select a Web page embodiment as the delivery location and a download to hard disk as the delivery device.

In another variation on the systems and methods described above, the entity that operates a server 10 or kiosk 20 may receive a fee or services in exchange for presenting a question as part of a survey conducted at a kiosk 20. In some aspects, such a question would be presented only to members of specific demographic groups as requested by the entity paying a fee or services to obtain responses to a question.

In yet another variation on the systems and methods described above, an end-user may establish a user account without using the kiosk 20, i.e., via a web page that is linked the system. Such a user account may require that an end-user pay a fee or may be offered without charge. Such a user account permits the end-user to receive marketing and promotional materials—including, as non-limiting examples, promotional codes, coupons, user specific advertisements determined by user preference settings or demographic data, and notices of forthcoming content and events related to content, such as concert dates, book signings, and so forth—via email or other communications methods. Such a user account also permits a server 10 to track with more precision the activity of the end-user across multiple kiosks 20, browsing sessions, and purchase transactions.

By using this Web page technique, a content provider 30 may be enabled to encompass multiple activities related to exemplary embodiments through a single connection or interface. For example, a content provider 30 may use a Web page provided by the operator of a server 10 in order to complete any of the following activities: upload content to a server 10; indicate use instructions for content, either for specific pieces of content or by category or parameters describing multiple pieces of content; upload advertising content to a server 10; make recommendations to the operator of a server 10 as to preferred advertising content to be associated with content provided by that content provider 30; view or download sales data related to content provided by that content provider 30; view or download aggregate sales data or statistics related thereto for content provided by multiple content providers 30; view or download demographic data associated with purchase, viewing, or use of content provided by that content provider 30; view or download aggregated demographic data or statistics related thereto associated with purchase, viewing, or use of content provided by multiple content providers 30; configure preferences related to that content provider's upload, download, viewing, or other settings when interacting electronically with a server 10; and control or configure automatic provision of kiosk data or statistics related thereto to the content provider 30 via email or communications methods known in the art.

In another variation on the systems and methods described above, a first device comprises a kiosk and a second device comprises a peripheral that may optionally be located remotely from that kiosk.

In still another variation on the systems and methods described above, multiple kiosks 14 may be linked in a manner such that purchases are completed on one or more kiosks 20 but the delivery location for all such purchases is a designated delivery device located on a specific kiosk 20. As one example, a retail establishment could maintain multiple kiosks 14 at which customers could browse available content. After purchase of content through any of those multiple kiosks 14, all end-users would collect an audio CD, DVD video disk, or other delivery device from a separate kiosk 20 that was designed for high-volume generation of such delivery devices.

In addition to any previously indicated variation, numerous other modifications and alternative arrangements may be devised by those skilled in the art without departing from the spirit and scope of the invention and appended claims are intended to cover such modifications and arrangements. Thus, while the invention has been described above with particularity and detail in connection with what is presently deemed to be the most practical and preferred aspects of the invention, it will be apparent to those of ordinary skill in the art that numerous modifications, including but not limited to, form, function, manner of operation and use may be made without departing from the principles and concepts set forth herein.

We claim:

1. A method for advertising, comprising:
   storing digital content in a storage device;
   providing a distribution device for distributing the digital content to a user, the distribution device comprising a video display on which advertising is displayed, wherein the storage device is located remotely from the distribution device;
   electronically connecting the storage device and the distribution device using a communication network;
   semi-dynamically transferring the digital content and the advertising from the storage device to the distribution device, wherein semi-dynamically transferring the digital content and the advertising includes transferring at least some of the digital content and advertising at scheduled push times in response to a determination by the storage device that the at least some of the digital content and advertising will make efficient use of the distribution device, and subsequently transferring other of the digital content and advertising not received at the scheduled push times in substantially real-time in response to requests from the distribution device to the storage device;
   collecting information about the user of the distribution device, wherein the collected information includes browsing activities by the user;
   customizing advertising at the distribution device for the user based at least in part on the collected information;
   displaying the customized advertising on the video display while the user interacts with the distribution device;
   collecting additional information about the user, wherein the collected additional information includes sales/transaction data;
   further customizing advertising for the user based at least in part on a combination of the collected information and the collected additional information;
   displaying the further customized advertising on the video display while the user interacts with the distribution device;
   distributing the digital content from a second distribution device to a delivery device of the user; and
   distributing advertising to the delivery device, wherein the distributed advertising is customized for the user based at least in part on a combination of the collected information and the collected additional information.

2. The method of claim 1, further comprising playing the digital content, received from the distribution device, on the delivery device using software with the distributed advertising integrated therewith.

3. The method of claim 1, further comprising displaying the advertising on the delivery device.

4. The method of claim 1, further comprising displaying physical advertising to the user on or near the distribution device.

5. The method of claim 1, further comprising displaying electronic advertising the user on the distribution device.

6. The method of claim 1, further comprising integrating the distributed advertising with the digital content during the process of distribution to the delivery device.

7. The method of claim 1, further comprising displaying non-integrated advertising on the delivery device.

8. The method of claim 1, wherein one or more of the customized advertising, the further customized advertising, or the distributed advertising comprises promotion of products available on the distribution device, wherein the products have been customized to one or more artists or one or more venues.

9. The method of claim 1, wherein at least one of collecting the information or collecting the additional information comprises collecting data about the delivery device on which each of the users receives the digital content.

10. The method of claim 1, wherein providing a distribution device comprises providing a kiosk.

11. A system for advertising, comprising:
    a first storage device storing digital content and advertising;
    a kiosk configured to collect information about each of a plurality of users of the kiosk, the kiosk comprising:
      a first computing apparatus including an input device, the first computing apparatus connected to a communications network that receives the digital content and the advertising on a semi-dynamic basis from the first storage device through the communications network, wherein receiving the digital content and the advertising on a semi-dynamic basis includes receiving at least some of the digital content and advertising at scheduled push times in response to a determination by the first storage device that the at least some of the digital content and advertising will make efficient use of the kiosk, and subsequently receiving other of the digital content and advertising not received at the scheduled push times in substantially real-time in response to requests from the kiosk to the first storage device;
    a second storage device storing at least some of the digital content and advertising;
    a second computing apparatus including an output device, the second computing apparatus configured to:
      collect information about each user of the plurality of users, wherein the collected information includes browsing activities by each user;
      customize advertising displayed to each user of the plurality of users based on the information collected from the kiosk;
      collect additional information about each user, wherein the collected additional information includes sales/transaction data;
      further customize advertising for each user based at least in part on a combination of the collected information and the collected additional information; and distribute the digital content to each of the plurality of users; and a display for displaying the customized advertising and the further customized advertising to each user of the plurality of users; and a second kiosk to deliver the digital content; and a delivery device that receives the digital content from the second kiosk.

12. The system of claim 11, wherein the display for displaying customized advertising to a plurality of users comprises a physical display.

13. The system of claim 11, wherein the display for displaying customized advertising to a plurality of users comprises an electronic display.

14. The system of claim 11, wherein the kiosk further comprises computer implemented software for integrating the advertising with the digital content during the process of distribution to the delivery device.

15. The system of claim 11, wherein the input device is configured to collect information about a user of the kiosk.

16. The system of claim 15, wherein the second computing apparatus is configured to combine and analyze the collected user information using an algorithm to generate the customized advertising, where the collected user information comprises conversion data, browsing activities, demographic data, survey information, user preference data, user-indicated items of interest, user account information, biometric data, sales/transaction data, advertising data, data about the delivery device on which the user receives the content, or combinations thereof.

17. A method of customizing advertising, comprising:
providing a distribution device comprising:
a storage device storing digital content;
a first computing apparatus located within the distribution device and including an input device connected to a communications network;
a second computing apparatus configured to distribute the digital content to each of a plurality of users and including at least one output device; and
a display configured to display advertising to each of the plurality of users;
receiving the digital content and the advertising at the first computing apparatus on a semi-dynamic basis from another storage device through the communications network, wherein receiving the digital content and the advertising on a semi-dynamic basis includes receiving at least some of the digital content and advertising at scheduled push times in response to a determination by the other storage device that the at least some of the digital content and advertising will make efficient use of the distribution device, and subsequently receiving other of the digital content and advertising not received at the scheduled push times in substantially real-time in response to requests by the distribution device to the other storage device;

collecting use information at the distribution device about use of the distribution device by at least one user of the plurality of users, wherein the information comprises browsing activities;

displaying customized advertising at the distribution device while the at least one user interacts with the distribution device, wherein the customized advertising is based at least in part on the collected information;

collecting additional use information about use of the distribution device by the at least one user, wherein the collected additional use information includes sales/transaction data;

displaying further customized advertising at the distribution device while the at least one user interacts with the distribution device, wherein the further customized advertising is based at least in part on a combination of the collected use information and the collected additional use information;

distributing at least a portion of the digital content from a second distribution device to a delivery device of the at least one user; and distributing at least a portion of the advertising to the delivery device, wherein the distributed advertising is customized for the at least one user based at least in part on a combination of the collected use information and the collected additional use information; and displaying advertising on the distribution device and distributing the digital content from the second distribution device.

18. The method of claim 17, wherein distributing advertising to the delivery device comprises providing software with the distributed advertising integrated therewith for playing the digital content received from the distribution device.

19. The method of claim 18, further comprising integrating the distributed advertising with the digital content during the process of distribution to the delivery device.

20. The method of claim 18, wherein distributing advertising to the delivery device comprises distributing advertising independent of the digital content.

21. The method of claim 18, further comprising displaying the distributed advertising on the delivery device.

22. The method of claim 17, wherein at least one of collecting the use information or collecting the additional use information comprises collecting data about the delivery device on which the at least one user receives the digital content.

23. The method of claim 18, wherein providing a distribution device comprises providing a kiosk.

24. The method of claim 17, further comprising displaying at least one of the customized advertising, the further customized advertising, or the distributed advertising to the plurality of users on the distribution device.

* * * * *